Oct. 2, 1923.
F. L. WATERMAN
SCREEN
Filed March 25, 1919
1,469,490
3 Sheets-Sheet 1
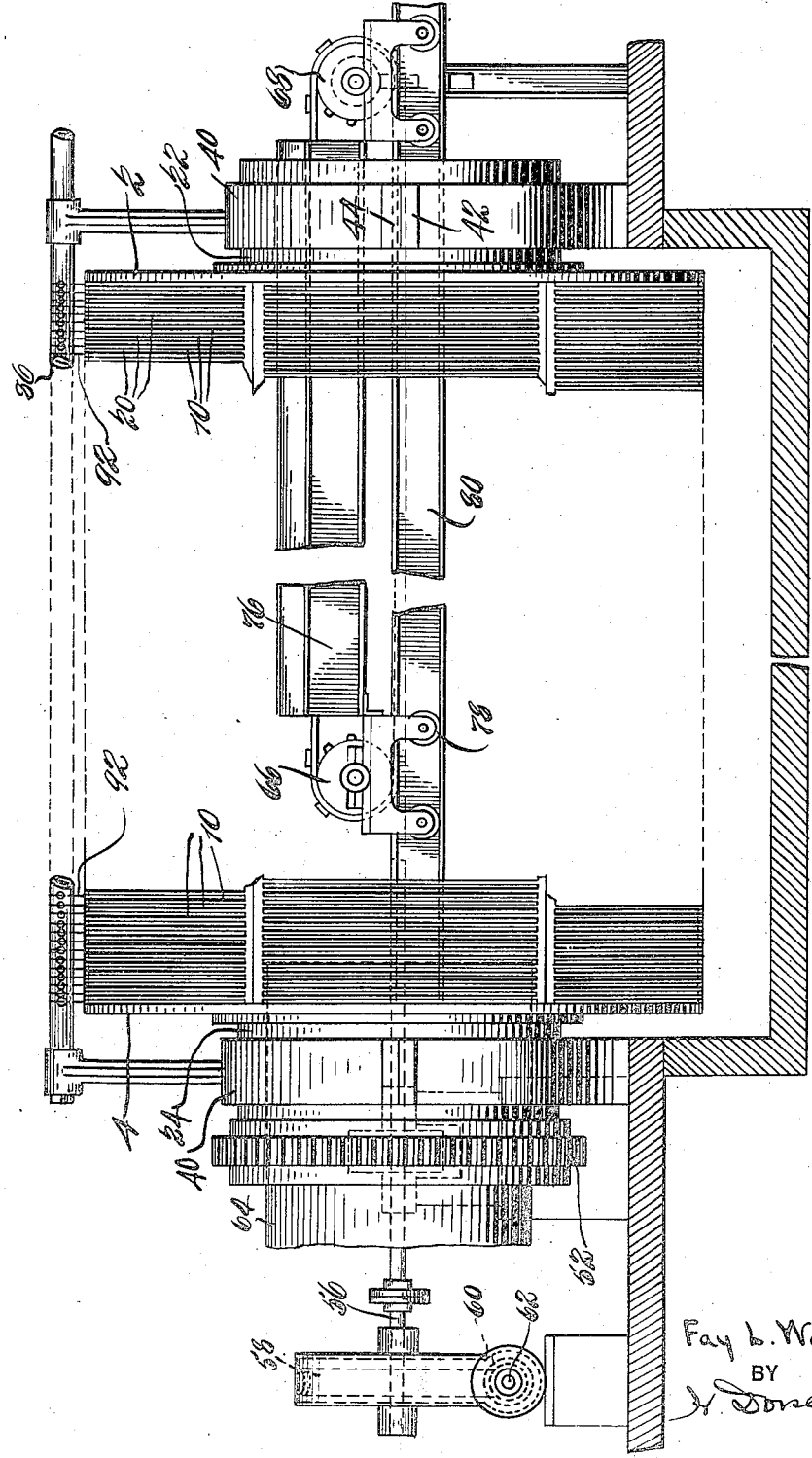
INVENTOR
Fay L. Waterman
BY
H. Dorsey Spencer
ATTORNEY

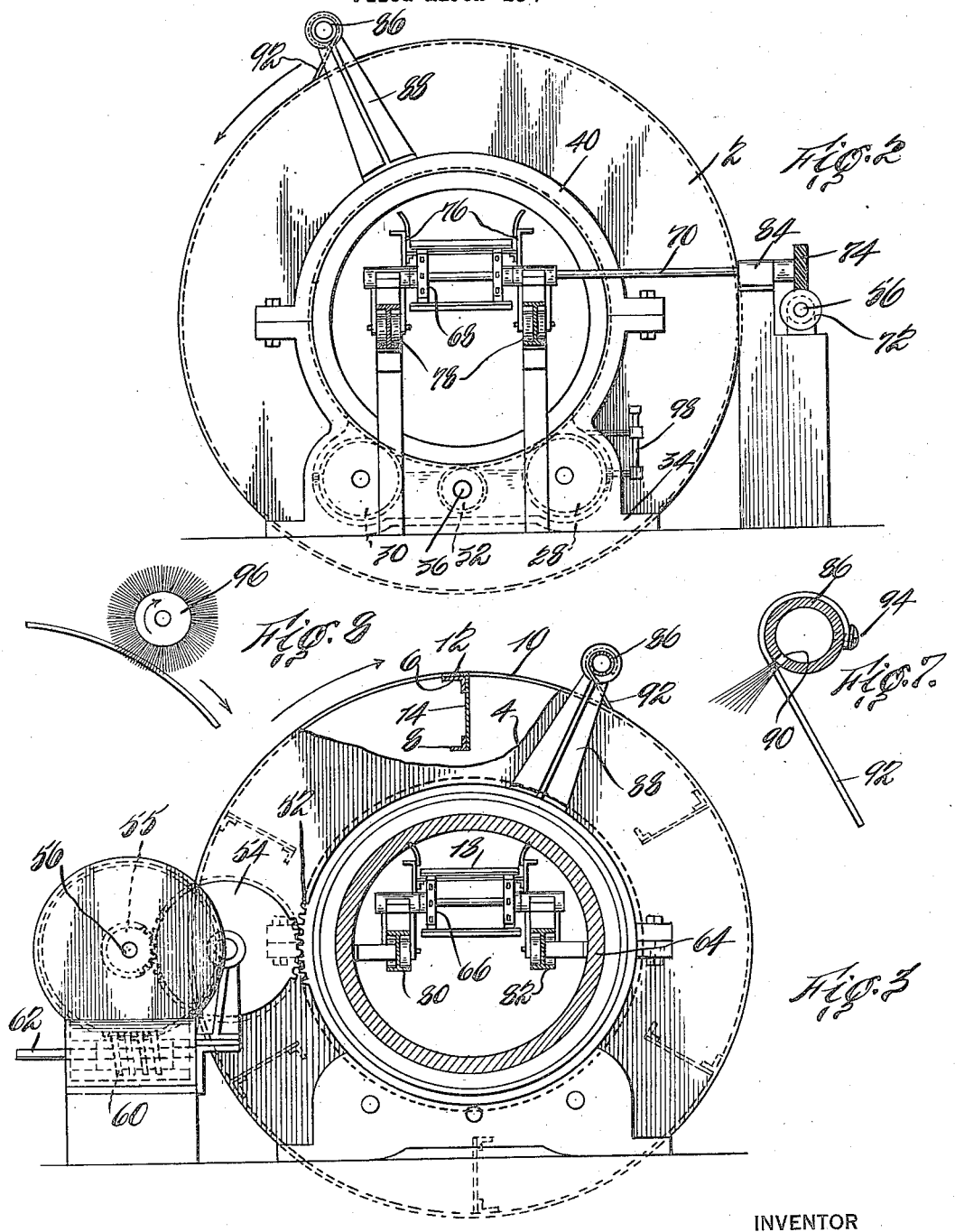

Oct. 2, 1923.
F. L. WATERMAN
SCREEN
Filed March 25, 1919
1,469,490
3 Sheets-Sheet 3
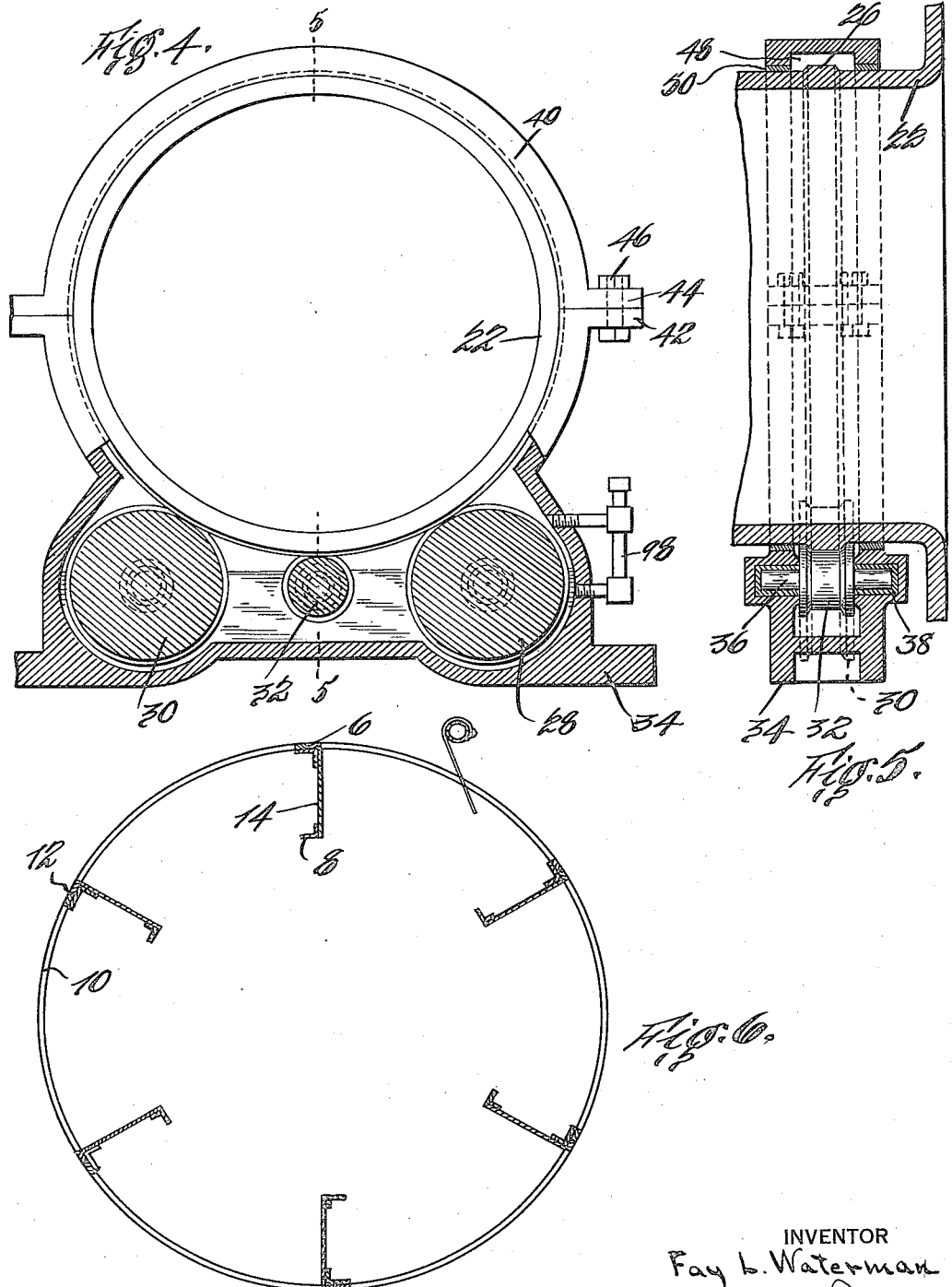
INVENTOR
Fay L. Waterman
BY
H. Dorsey Spencer
ATTORNEY Patented Oct. 2, 1923.

1,469,490

UNITED STATES PATENT OFFICE.

FAY L. WATERMAN, OF ENDICOTT, NEW YORK; ELLEN WATERMAN ADMINISTRATRIX OF SAID FAY L. WATERMAN, DECEASED.

SCREEN.

Application filed March 25, 1919. Serial No. 284,974.

*To all whom it may concern:*

Be it known that I, FAY L. WATERMAN, a citizen of the United States, residing at Endicott, Broome County, New York, have invented certain new and useful Improvements in Screens, of which the following is a clear, full, and exact description.

This invention relates to rotating screens, and particularly to rotating cylindrical screens, of the outward flow type, which are especially adapted for screening the sludge and solids from sewage and for similar purposes.

A general object of the invention is to improve and to simplify the construction of rotatable screens, and particularly to improve and to simplify the means for supporting and operating such screens, and the means for maintaining them in operative condition, to the end that a screen for the aforementioned and other purposes may be provided which may be operated continuously and effectively with little attention.

More particularly the invention aims to provide improved means for preventing clogging of the screening openings and to insure the collection and discharge of the material removed by the screening operation. The invention aims further to provide a self-lubricating, water-tight and substantially frictionless bearing for a screen of this type and particularly for a screen in which hollow screen supporting trunnions are utilized for the introduction of material into and its removal from the screen.

An important feature of the invention is the provision of resiliently mounted slot cleaning members projecting normally into circumferentially arranged screening slots in the cylindrical outer wall of the screen at one point in the rotating travel of said wall, said members being arranged to swing yieldingly out of the slots when engaged by the ends of the individual slots as the screen rotates, the aforementioned slot cleaning means being preferably associated with or supplemented by means for directing jets of water upon the slots to be cleaned.

Other objects and important features of the invention will appear from the following description and claims when considered in connection with the accompanying drawings in which Fig. 1 is a view, in side elevation, with parts broken away, of a screen embodying the present invention, the well in which the screen operates being shown in longitudinal section;

Fig. 2 is a view, in end elevation, of the sludge discharge end of the screen;

Fig. 3 is a view, in end elevation, of the material receiving end of the screen;

Fig. 4 is an enlarged view of the trunnion bearings at one end of the screen, showing the oil reservoir in section;

Fig. 5 is a section on the line 5—5 of Fig. 4;

Fig. 6 is a transverse section, illustrating particularly the construction of the cylindrical screen;

Fig. 7 is an enlarged section of the screen cleaning device showing one of the resilient cleaning members and the water jet; and Fig. 8 is a detail view of a modified form of the invention in which a rotating brush is associated with the slot cleaning devices, particularly for supplementing the cleaning action at one end of each slot.

The illustrated embodiment of the invention comprises a cylindrical screen having end walls 2 and 4 connected by angle bars 6 and 8, the angle bars 6 being so placed about the axis of the cylinder that they form supports for slotted plates 10, at the joints 12 between successive plates, the outer sides of the angle bars 6 over-lapping these joints and being connected to the unslotted parts of the respective plates 10. The angle bars 6 and 8 also support between them baffle plates or lifting blades 14 which serve to pick up the sludge or other material strained from the sewage and carry it into position to be discharged upon the bottom of the trough or sluiceway 16, over which the endless conveyor 18 travels. The slots 20 in the plates 10 are circumferentially arranged with respect to the axis of the cylinder.

Connected to the end plates 2 and 4 of the cylindrical screen are hollow trunnions 22 and 24, each provided with a circumferential rib 26 received in a correspondingly shaped groove in bearing rollers 28, 30 and 32. The bearing rollers 28, 30 and 32 have their bearings in a casing 34 and support the weight of the screen through the trunnions 22 and 24, each of these rollers being provided with trunnions received in babbitted bearings formed in recesses in the casing 34, the trunnions 36 for the roller 32 being shown in Fig. 5 of the drawings, and the babbitt being shown at 38 in this figure.

The casing 34 which is adapted to contain oil in which the rollers 28, 30 and 32 run and which, therefore, insures the lubrication of said rollers and of the surface of the trunnion against which the rollers bear, is shaped to fit closely against the periphery of the trunnion throughout a part of its circumference, as shown in Figs. 2, 3 and 4 of the drawings, and a half ring 40 of similar cross section is clamped to the upper ends of the trunnion engaging parts of the casing 34, ears 42 and 44 being provided to receive the clamping bolts 46. It will be noted that that part of the casing 34 which engages the trunnion, as well as the half ring 40, is shaped in cross section to provide a space 48 in which the rib 26 of the trunnion freely travels, a bearing surface of Babbitt metal 50 or other suitable material being provided between the trunnion and its surrounding bearing, thus forming a liquid tight joint, which is very important in apparatus of this type when used for screening sewage or similar materials. When used for such operations, it will be understood, of course, that the screen will operate almost continuously and that it is important that it utilize as little power as possible to drive it. The illustrated bearing construction is thus useful not only in providing a substantially frictionless support for a comparatively heavy screen, which is substantially self-lubricating, but also in providing a bearing which is substantially water-tight and thus proof against injury from the materials handled by the screen.

The illustrated screen may be driven in any suitable manner, as, for example, through the gear ring 52, carried by one of the trunnions, with which meshes an idler gear 54 driven by a pinion 55 upon a shaft 56 extending lengthwise of the screen, said shaft being driven by a worm wheel 58, in turn driven by a worm 60 upon a shaft 62 connected to any suitable source of power, as, for example, to an electric motor. The shaft 56 extends the whole length of the screen and at its other end drives a discharging mechanism for discharging the material separated by the screen, this discharging mechanism being substantially of the same construction as that shown in my Letters Patent No. 1,279,949, dated September 24, 1918. The sewage or other material to be screened is introduced into the screen through one of the hollow trunnions, a portion of the pipe for taking this material into the screen being shown at 64, in Fig. 1 of the drawings, as entering the screen through the hollow trunnion 24.

As above suggested, the discharging mechanism is of substantially the same construction as that shown in my Letters Patent above identified and comprises the trough 27, extending throughout a substantial portion of the length of the screen and also projecting through the hollow trunnion 22, and an endless conveyor 18 traveling over the bottom of this trough and serving to move the outside of the screen material discharged upon the trough and upon the conveyor by the baffles or blades 14. The endless conveyor 18 is supported upon sprockets 66 and 68, the sprockets 68 being connected to a shaft 70 driven from the shaft 56 through a bevel gear 72 on shaft 56 and a bevel pinion 74 on shaft 70. As in my Letters Patent above identified, the endless conveyor is mounted upon a carriage 76 having rollers 78 guided in tracks in the two sides of I-beams 80 and 82 extending to the outside of the screen, whereby, when it is desired to clean the conveyor or to repair it, the conveyor may be moved bodily out of the screen by merely disconnecting the bearing 84 for the shaft 70, or by providing any suitable means for disconnecting the shaft 70 from the conveyor.

When a screen of this type is used for screening sewage coming from sources which deliver into the sewage materials that are likely to clog the screen, as for example, sewage from tanneries, which usually contains a considerable amount of hair, it is important that means be provided for keeping the slots of the screen clean. As disclosed in my Letters Patent above identified, I preferably provide with the screen means for projecting jets of water upon the outside of the screen to force inward any materials which tend to clog the slots, the illustrated means comprising a pipe 86 extending throughout the length of the screen and supported upon brackets 88 connected to the trunnion bearings at the ends of the screen, this pipe being provided with jet openings 90 so arranged as to direct a series of jets upon the outer surface of the screen.

The projection of jets of water upon the screen serves for the most part to keep the screen in proper operative condition, but, in order to insure the removal of materials, such as hair, from the slots, which are not easily removed by water, I have devised means for more positively effecting the cleaning of the slots, such means constituting one of the most important features of the present invention. The illustrated means for effecting a positive cleaning of the screen, comprises a series of wires of spring metal, such for example as piano wires, carried upon a support extending along the screen, the end of each of the resilient members or wires 92 projecting normally into one of the slots 20 of the screen.

In the illustrated construction, the spring wires 92 are supported upon the spray pipe 90, each wire having a curved end partly encircling said pipe and having a loop receiving a set screw 94 by which it is attached to said pipe. Each of the wires 92 preferably projects through the slot 20 of the screen at an angle to the periphery of the screen somewhat between a normal and a tangent whereby the wire tends to push down into the screen any material which may have become caught in the slot and at the same time it is easily moved out of the slot to ride over into the slot in the next plate when engaged by the end of the slot.

By arranging the yielding slot cleaning members 92 in close proximity to the jets 90, as shown in Fig. 3 of the drawings, the screen is prepared for the operation of the mechanical cleaning means by having the jets act upon each part of the screen just before the slot cleaning members 92 act upon that part.

In Fig. 8 of the drawings is intended to be illustrated a slight modification of the invention in which the action of the slot cleaning wires 92 is facilitated by, or supplemented by, a rotating brush 96, which rotates in such a direction that that part of the brush which engages the screen travels in the same direction as the screen surface but at a higher rate of speed, the purpose of this brush being to facilitate or to supplement the cleaning action of the wires 92, particularly at that end of the slot in the screen which the wire 92 last engages. In most cases, the use of such supplemental cleaning brush will be found to be unnecessary, the use of this brush being suggested only for conditions where the character and quantity of material handled by the screen is such that there is a marked tendency to clogging. The brush may be rotated by any suitable connection to the mechanism for driving the screen.

To insure the maintenance of a proper level of oil in the casing 34, an oil gage 98 may be provided. It will be understood, also, that, if found desirable, any suitable means may be provided upon the outer surface of the screen for guiding each wire into the initial end of the succeeding slot as it rides out of one slot into the next slot.

From the foregoing description, it will be seen that there has been provided by this invention a screen of simple and substantial construction which can be operated with a small amount of power and with very little attention and which is self-lubricating. Moreover, when equipped with the removable discharging conveyor of my Letters Patent above identified, there is provided a screen construction of particular utility in screening sewage and other waste.

What I claim as new is:

1. In apparatus of the class described, the combination with a rotating screen having circumferentially arranged series of screening slots, of slot cleaning means located upon the face of said screen opposite to that on which the screened material is collected and comprising resiliently mounted members arranged to spring into and through said slots at a point in the rotating travel of said slots, said members being retensioned by engagement with the portions of said screen between successive slots of the respective series.

2. In apparatus of the class described, the combination with a rotating screen having a series of parallel circumferentially arranged screening slots, of slot cleaning means located upon the face of said screen opposite to that on which the screened material is collected and comprising a corresponding series of resiliently mounted individual members past which the screening surface moves, said members being arranged to spring into and through the respective slots as said slots are passing said members.

3. In apparatus of the class described, the combination with a rotating screen having a series of parallel circumferentially arranged screening slots, of slot cleaning means located upon the face of said screen opposite to that on which the screened material is collected and comprising a corresponding series of resiliently mounted individual slot engaging members past which the screening surface moves, said members being located along a non-screening part of the rotating travel of said screening surface and being arranged to spring into and through the respective slots as said slots are passing said members.

4. In apparatus of the class described, the combination with a rotating screen having a series of parallel circumferentially arranged screening slots, of slot cleaning means located upon the face of said screen opposite to that on which the screened material is collected and comprising a corresponding series of individual slot engaging members arranged to move into and through the respective slots and to move relatively thereto at a point in the non-screening travel of the rotating screening surface, said members moving yieldingly out of said slots as the end of each slot passes its associated cleaning member.

5. In apparatus of the class described, the combination with a rotating screen having circumferentially arranged screening slots, of a spray pipe extending lengthwise of said screen and arranged to project jets of water upon the screening surface, and resilient slot cleaning means located upon the face of said screen opposite to that on which the screened material is collected and carried by said spray pipe and arranged to spring into and through said slots and to effect a mechanical cleaning of said slots in proximity to the point of action of said spray.

6. In apparatus of the class described, the combination with a rotating strainer having circumferentially arranged series of straining slots, of slot cleaning means upon the discharge side of said slots comprising resiliently mounted members arranged to spring into said slots at a point in the rotating travel of said slots, and auxiliary means for facilitating the slot cleaning action of the aforementioned cleaning members.

7. In apparatus of the class described, the combination with a rotating screen having circumferentially arranged series of screening slots, of slot cleaning means upon the discharge side of said slots comprising resiliently mounted members arranged to spring into said slots at a point in the rotating travel of said slots, and means for projecting jets of water upon the screen in proximity to the point of operation of the cleaning members.

Signed at Endicott, N. Y., this 14th day of March, 1919.

FAY L. WATERMAN

Witnesses:
MARY HERTEL,
GEORGE W. GESLER.